United States Patent
Nizet et al.

(10) Patent No.: US 11,884,114 B2
(45) Date of Patent: Jan. 30, 2024

(54) METHOD FOR DETERMINING THE LOAD APPLIED TO A TIRE

(71) Applicant: COMPAGNIE GENERALE DES ETABLISSEMENTS MICHELIN, Clermont-Ferrand (FR)

(72) Inventors: Pierre Nizet, Clermont-Ferrand (FR); Antoine Paturle, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 407 days.

(21) Appl. No.: 17/293,779

(22) PCT Filed: Nov. 11, 2019

(86) PCT No.: PCT/FR2019/052697
§ 371 (c)(1),
(2) Date: May 13, 2021

(87) PCT Pub. No.: WO2020/099784
PCT Pub. Date: May 22, 2020

(65) Prior Publication Data
US 2022/0274449 A1    Sep. 1, 2022

(30) Foreign Application Priority Data
Nov. 14, 2018 (FR) .................................. 1860478

(51) Int. Cl.
*B60C 23/04* (2006.01)
*B60C 23/00* (2006.01)
(Continued)

(52) U.S. Cl.
CPC ........ *B60C 23/0486* (2013.01); *B60C 23/002* (2013.01); *G01G 19/08* (2013.01); *G01M 17/02* (2013.01); *B60C 2019/004* (2013.01)

(58) Field of Classification Search
None
See application file for complete search history.

(56) References Cited

U.S. PATENT DOCUMENTS 9,834,045 B2 * 12/2017 Freytag ................. B60C 23/064
10,000,100 B2    6/2018 Weston
(Continued)

FOREIGN PATENT DOCUMENTS

| EP | 2937232 A1 | 10/2015 |
| WO | 2012/091719 A1 | 7/2012 |
| WO | 2018/003942 A1 | 1/2018 |

OTHER PUBLICATIONS

International Search Report dated Feb. 17, 2020, corresponding PCT/FR2019/052697 (4 pages).

*Primary Examiner* — Peter J Macchiarolo
*Assistant Examiner* — Jermaine L Jenkins
(74) *Attorney, Agent, or Firm* — VENABLE LLP (57) ABSTRACT

A method for determining the loading of a tire (1) mounted on a vehicle (9) and running along the ground, said tire (1) being equipped with a sensor (10), comprises: acquisition, by the sensor (10), of a measurement signal representative of the change in curvature of the tire (1) during running, determination, from the measurement signal, of measurement data comprising a first parameter representative of a length of a contact patch (6) in contact with the ground (7) during a revolution of the wheel bearing the tire, and determination of the loading of the tire (1) as a function of the first parameter, of the internal pressure of the tire, and of a firmness factor representative of a condition of firmness of (Continued)

the ground, which is derived from measurements taken while the tire is rolling over said ground.

15 Claims, 5 Drawing Sheets (51) Int. Cl.
*G01M 17/02* (2006.01)
*B60C 19/00* (2006.01)
*G01G 19/08* (2006.01)

(56) References Cited

U.S. PATENT DOCUMENTS

| | | |
|---|---|---|
| 11,230,148 B2* | 1/2022 | Begou .................. B60T 8/1725 |
| 11,267,298 B2 | 3/2022 | Begou et al. |
| 2013/0278406 A1 | 10/2013 | Weston |
| 2019/0212138 A1 | 7/2019 | Hanatsuka et al. |

* cited by examiner

METHOD FOR DETERMINING THE LOAD APPLIED TO A TIRE

GENERAL TECHNICAL FIELD AND CONTEXT OF THE INVENTION

The present invention relates to determining the conditions of rolling of a tyre along the ground. More specifically, the invention proposes determining the load applied to a tyre by means of a measurement signal representative of the circumferential curvature of the tyre and of the pressure inside the tyre.

It has been found that it is actually beneficial to know, at any moment, the conditions of rolling of a tyre along the ground, in order to interact with the driver or with the driving aid systems in order to provide these with real-time information as to changes in the running conditions and, possibly, to react to same. Specifically, in a vehicle mounted on wheels, the tyres generally represent the only points of contact with the ground, through which the main mechanical interactions of the vehicle with its environment occur.

The loading is important in as much as it affects the life of the tyre. Thus, it may be desirable to monitor the levels of tyre loading in order to ensure that the tyre is used within satisfactory conditions of safety, particularly with regard to other factors such as the speed of the vehicle, or the load-bearing capacity of the tyre. In addition, tyre loading may be monitored in order to determine other characteristics relating to tyre wear, for example by using a loading history in order the better to estimate tyre wear and decide to replace the tyre at the most opportune moment. In addition, actions can be taken in order to adapt the running conditions to the load. For example, the pressure of a tyre can be modified to adapt it to the load being applied to the tyre.

Patent application WO2012091719 (A1) describes a method involving measuring an internal pressure inside the tyre using a sensor placed inside the tyre and determining an angular parameter representative of the length of a contact patch in which the tyre is in contact with the ground during a revolution of the wheel bearing the tyre, from a measurement signal representative of the change in curvature of the tyre during running. The tyre loading is then determined from a look-up table collating various combinations of the angular parameter and of the tyre pressure. However, the proposed method allows the loading to be determined only on road (very firm ground such as the asphalt of a road) and lacks reliability when different types of ground are encountered, and cannot be applied as-is to loose ground, for example of the agricultural ground type or the type of ground encountered by 4×4 or military vehicles.

SUMMARY OF THE INVENTION

One object of the invention is to allow the load applied to a tyre mounted on a vehicle to be determined in real time by taking into consideration the firmness of the ground over which the tyre is running.

To this end, the invention proposes a method for determining the loading of a tyre mounted on a vehicle and running along the ground, said tyre being equipped with a sensor configured to acquire a measurement signal representative of the change in curvature of the tyre as it runs along the ground, the method comprising the following steps:

the acquisition, by the sensor of a measurement signal representative of the change in curvature of the tyre during running, the obtaining of a measurement of the internal pressure of the tyre, the determination, from the measurement signal, of measurement data comprising a first parameter representative of a length of a contact patch in contact with the ground during a revolution of the wheel bearing the tyre, the obtaining of a firmness factor representative of a condition of firmness of the ground, which is derived from measurements taken while the tyre is rolling over said ground, the determination of the loading of the tyre as a function of the first parameter, of the firmness factor and of the internal pressure of the tyre.

The method allows the loading of a tyre mounted on the vehicle to be determined in real time in a way that is simple, precise and reliable regardless of the condition of firmness of the ground over which the tyre is running, on the basis of a measurement signal representative of the change in curvature of the tyre.

This method is advantageously supplemented by the following features, considered alone or in any technically feasible combination thereof:

the loading of the tyre is determined by using a relationship connecting said load, the pressure, the firmness factor and the first parameter;

the relationship connects said load, a logarithm of the first parameter (KL), a logarithm of the firmness factor and a logarithm of the pressure, and is of the form:

$$Z = d + e \log_{10}(P) + f \log_{10}(KL) + g \log_{10}(F)$$

where Z is a loading factor, P is the internal pressure of the tyre, KL is the first parameter, F is the firmness factor and d, e, f and g are predetermined non-zero fixed real coefficients;

during running, over the course of one revolution of the wheel, the curvature of the tyre changes according to a cycle exhibiting a part not in contact with the ground, characterized in the measurement signal by a stable curvature, a part in contact with the ground, characterized in the measurement signal by a spike in the variation of contact curvature, a transition referred to as the coming-into-contact transition between the part not in contact with the ground and the part in contact with the ground, characterized in the measurement signal by a coming-into-contact curvature variation spike that is the opposite of the spike in the variation of contact curvature, and a transition referred to as the coming-out-of-contact transition between the part in contact with the ground and the part not in contact with the ground, characterized in the measurement signal by a coming-out-of-contact curvature variation spike that is the opposite of the spike in the variation of contact curvature, the first parameter being determined from a distance between a coming-into-contact curvature variation spike the coming-out-of-contact curvature variation spike;

the measurement data comprise a second parameter determined from the measurement signal, representative of a rate of flattening of the tyre upon contact with the ground during a revolution of the wheel bearing the tyre, and wherein the firmness factor is determined from the first parameter and from the second parameter;

during running, during the course of one revolution of the wheel, the curvature of the tyre changes according to a cycle exhibiting a part not in contact with the ground and a part in contact with the ground, the first parameter being determined from part of the measurement signal corresponding to the part in contact with the ground, and the second parameter is determined from part of the measurement signal corresponding to a transition in the curvature of the tyre between the part not in contact with the ground and the part in contact with the ground;

the second parameter is determined from a gradient between the coming-into-contact curvature variation spike and the spike in the variation of contact curvature;

the firmness factor indicating the firmness of the ground is determined using a relationship connecting the firmness factor indicating the firmness of the ground, the first parameter and the second parameter;

the relationship connecting the firmness factor indicating the firmness of the ground, the first parameter (KL) and the second parameter (KS) is a linear relationship and is of the form:

$$F = a + b \times KL + c \times KS$$

where F is the firmness factor, KL is the first parameter, KS is the second parameter, and a, b and c are predetermined fixed coefficients;

the loading of the tyre is determined using a relationship connecting said load, a logarithm of the first parameter, a logarithm of the second parameter and a logarithm of the pressure;

the relationship is of the form:

$$Z = d + e \log_{10}(P) + f \log_{10}(KL) + g \log_{10}(a + b \times KL + c \times KS)$$

where Z is a loading factor, KL is the first parameter, KS is the second parameter, and a, b, c, d, e, f and g are predetermined non-zero fixed real coefficients;

the load is determined by calculating a loading factor from the first parameter, from the second parameter and from the pressure, and by comparing said loading factor against thresholds delimiting loading categories.

The invention also relates to a tyre comprising a pressure sensor for the internal pressure inside the tyre, and a sensor sensitive to the change in curvature of the tyre and configured to generate a measurement signal representative of the change in curvature of the tyre as it runs over the ground, comprising an active part and an electronic board, the active part being configured to generate the measurement signal, the electronic board being configured to determine measurement data comprising:

a) a first parameter representative of a length of a contact patch in contact with the ground during a revolution of the wheel bearing the tyre, and b) a second parameter representative of a rate of flattening of the tyre upon contact with the ground during a revolution of the wheel bearing the tyre, the sensor being configured to transmit the measurement data to outside the tyre.

The invention also relates to a data processing unit configured to receive a pressure measurement and measurement data derived from a measurement signal representative of the change in curvature of the tyre as it runs over the ground, said measurement data comprising:

a) a first parameter representative of a length of a contact patch in contact with the ground during a revolution of the wheel bearing the tyre, and b) a second parameter representative of a rate of flattening of the tyre upon contact with the ground during a revolution of the wheel bearing the tyre, the data processing unit being configured to determine the loading of the tyre as a function of the first parameter, of the second parameter and of the pressure.

The invention also relates to a vehicle comprising:

at least one tyre, at least one sensor sensitive to the change in curvature of the tyre and configured to generate a measurement signal representative of the change in curvature of the tyre as it runs over the ground, at least one pressure probe designed to provide a measurement of the internal pressure of the tyre, a data processing unit configured to receive the measurement of the internal pressure of the tyre and measurement data derived from the measurement signal representative of the change in curvature of the tyre as it runs over the ground, and to determine the firmness of the ground as a function of the measurement data, the measurement data comprising:

a) a first parameter representative of a length of a contact patch in contact with the ground during a revolution of the wheel bearing the tyre, and b) a second parameter representative of a rate of flattening of the tyre upon contact with the ground during a revolution of the wheel bearing the tyre, the vehicle being configured to implement the method according to the invention.

The invention also relates to a computer program product comprising program code instructions for executing the method according to the invention when said program is executed on a computer. The computer program product may take the form of a non-transient computer-readable medium that stores code instructions for executing the method according to the invention, when said non-transient computer-readable medium is read by a computer.

BRIEF DESCRIPTION OF THE DRAWINGS

Further features, objects and advantages of the invention will become apparent from the following description, which is purely illustrative and non-limiting and should be read in conjunction with the appended drawings, in which.

DETAILED DESCRIPTION

Figure 1:
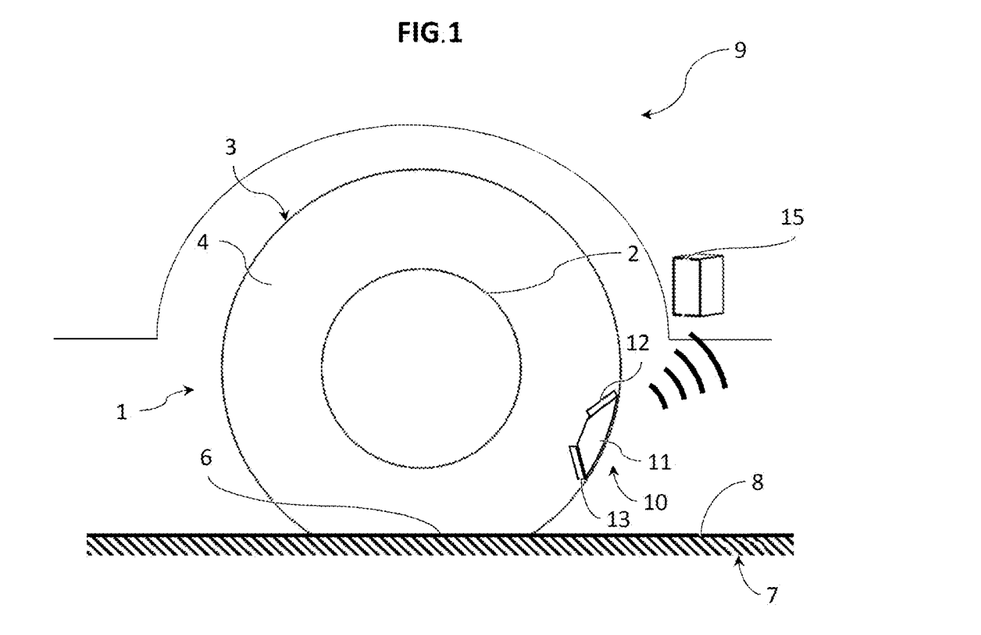
FIG. 1 schematically illustrates a tyre mounted on a rim of a vehicle.

FIG. 1 illustrates a tyre 1 mounted on a rim 2. Such a tyre 1 comprises, on the one hand, a crown region 3, constituting a tread exhibiting tread patterns, and, on the other hand, sidewalls 4 ending in lower sidewall regions. The latter generally comprise a bead wire and a bead for mounting the tyre 1 on the rim 2. The rim 2 is itself connected to the vehicle 9 by an axle (not depicted). The tyre 1 thus forms the ground contact system providing the connection between the vehicle 9 and the ground 7.

Thus, what is meant by a tyre is a resilient solid designed to be mounted on the rim 2 of wheel, generally in the form of a tyre band, to form the ground contact system providing the connection between the vehicle 9 and the ground 7, comprising a tread that undergoes a change in its circumferential radius of curvature when subjected to load. The tyre 1 is typically made of elastomers (for example rubber) and possibly other textile and/or metallic materials. However, as a preference, a tyre 1 comprises a flexible casing containing a pressurized gaseous interior, typically air. As this is the commonest form of tyre 1, the following description is given nonlimitingly with reference to such a pneumatic tyre 1 having an internal pressure of pressurized gas.

The tyre 1 is subjected to a force applied by the vehicle 9 via the axle and the rim 2 towards the ground 7. This force stems from the axle load, resulting from the weight of the vehicle 9. Because the rim 2 is non-deformable, this force, applied to the tyre 1, deforms the latter when the tyre 1 is in contact with the surface 8 of the ground 7: the part of the crown 3 below the rim 2 flattens, increasing the area of the contact patch 6 in which the tyre 1 is in contact with the ground, while the sidewalls 4 become distended. This deformation is all the more pronounced when the pressure inside the tyre is low. The nature of the ground 7 also has an influence on this deformation, and particularly the condition of firmness of this ground 7. Specifically, hard ground deforms little if at all, whereas soft ground deforms under the action of the tyre 1, so that the deformation of the tyre 1 is less as part of it is transferred to the ground 7.

The deformation of the tyre 1 results in a change to the circumferential curvature of the tyre 1, namely the curvature of the crown region 3. When the tyre 1 rolls, this change to the curvature travels around the circumference of the tyre 1. For a given point on the tyre 1, the curvature will therefore vary periodically with each revolution of the wheel.

The tyre 1 is fitted with a sensor 10 configured to acquire a measurement signal representative of the change in curvature of the tyre 1. This sensor 10 is situated inside the casing of the tyre 1. As a preference, the sensor 10 is situated against the crown region 3. The sensor 10 may be embedded in the structure of the tyre casing 10, or else may be attached thereto, and for example held in place by an adhesive layer. The sensor 10 comprises an active part 11 secured to the casing of the tyre 1, so that the deformation of the tyre 1 leads to a corresponding deformation of the active part 11 of the sensor 10, which generates a measurement signal that is a function of the deformation of its active part 11. The measurement signal is therefore truly representative of the change in curvature of the tyre.

As a preference, the sensor 10 is a piezoelectric sensor, which generates a voltage proportional to the variation in bending. More specifically, the sensor 10 may for example comprise an active part 11 made up of a piezoelectric layer between two conducting layers. It is also possible for the sensor 10 to be a resistive sensor, the impedance of which is proportional to the bending of the active part 11 of the sensor. It is also possible to use an accelerometer, although the use thereof is far more complicated and requires a greater amount of processing. The sensor 10 may also be suited to measuring other parameters, particularly the internal pressure. The sensor 10 may be incorporated into another piece of electronic equipment installed inside the tyre 1, such as a pressure and/or temperature sensor of TMS (tyre monitoring system) type.

The sensor 10 also comprises an electronic board 12 connected to the active part 11 of the sensor 10 and configured to receive the measurement signal coming from the active part 11. This electronic board 12 comprises at least a processor and a memory, and is suited to processing data such as the measurement signal, in order to determine measurement data from the measurement signal, and to communicating these measurement data. As a preference, the sensor 10 is associated with a wireless transmitter, notably of radiofrequency type, and for example of the type using Bluetooth Low Energy technology, or of the low-power device type operating in the 433 MHz band (LPD 433) able to relay the measurement signal to an automated data processing unit, preferably located outside of the tyre 1, for the processing thereof. The wireless transmitter may form part of the sensor 10, for example as a component of the electronic board 12, or may be distinct from the sensor 10. Thus for example it is possible to provide an antenna inside the tyre 1. In the case of wireless communication, an external receiver may receive the signals sent by the wireless communication means associated with the sensor 10, and relay them to the automated data processing unit.

Of course, the sensor 10 may comprise other elements involved in its correct operation, notably an electrical power supply module, for example consisting of a battery. As a preference, the tyre 1 comprises at least one pressure probe 13 designed to supply a measurement of the internal pressure inside the tyre, such as a TMS for example. This probe 13 may form part of the sensor 10.

Figure 3:
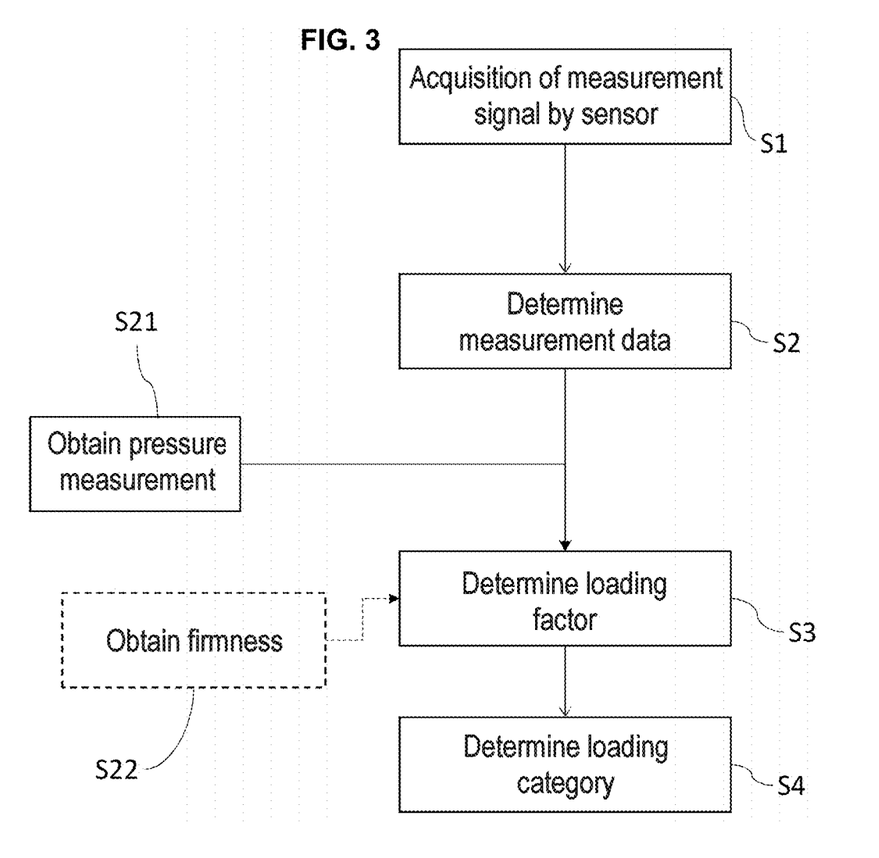
FIG. 3 shows a flowchart of the steps in the method for evaluating the firmness of the ground according to one possible embodiment of the invention.

When the tyre 1 is rolling along the ground, the sensor 10 acquires (step S1) the measurement signal representative of the change in circumferential curvature of the tyre. This measurement signal may be directly connected to the curvature (and therefore be a curvature measurement signal), and therefore monitor the change therein, or may be indirectly connected to the curvature. This is notably the case with a sensor 10 of which the active part 11 is a piezoelectric sensor, because the measurement signal then corresponds to the variation in curvature. It is this type of sensor that will be used in the examples which follow. The measurement signal, generated by the active part 11 of the sensor 10, is then processed by the electronic board 12 to determine measurement data from the measurement signal. The purpose of processing the measurement signal is to extract the useful information in this signal, which information is then exploited later on in the method.

Figure 2:
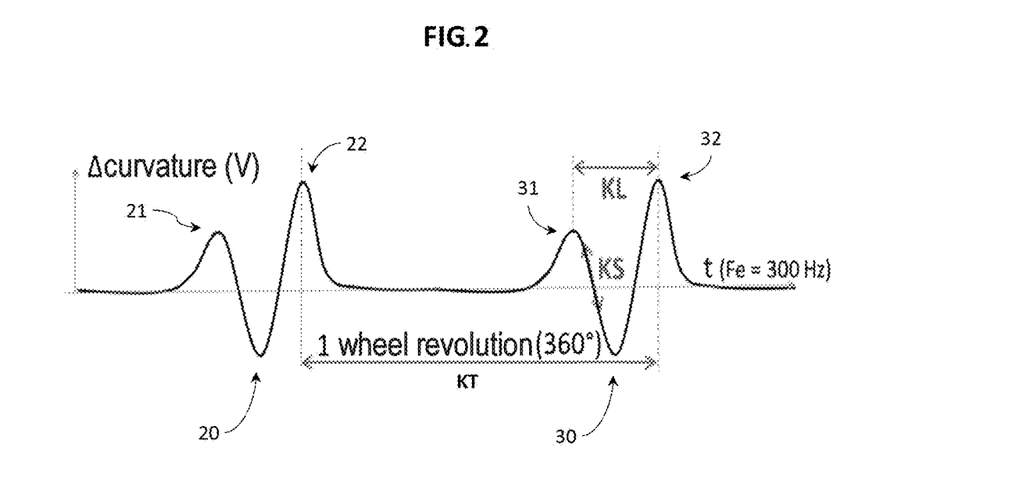
FIG. 2 shows an example of a measurement signal registered by a sensor sensitive to the curvature of the tyre as the tyre rolls.

FIG. 2 shows a schematic example of a measurement signal registered by a sensor 10 sensitive to the variation in curvature of the tyre as the tyre 1 rolls. The measurement signal is represented here by its voltage (in V) and designated $\Delta$curvature, as a function of the rotation of the wheel expressed in degrees.

During running, over the course of one revolution of the wheel, the curvature of the tyre changes according to a cycle exhibiting:

a part not in contact with the ground, a part in contact with the ground.

The sequence illustrates two passes into the contact patch in which the tyre is in contact with the ground, of that region of the tyre 1 in which the sensor 10 is located, these two passes being separated by a part of the cycle where there is not contact with the ground. The part of the cycle not in contact with the ground is characterized by a stable curvature, which results in stability of the measurement signal at a value close to zero. The part of the cycle in contact with the ground is characterized in the measurement signal by a spike in the variation of contact curvature 20, 30. In FIG. 2, the spikes in the variation of contact curvature 20, 30 are directed downwards, corresponding to negative voltage spikes. Specifically, the spikes in the variation of contact curvature 20, 30 correspond to the flattening of the tyre 1 in the contact patch 6.

The curvature also exhibits a transition referred to as the coming-into-contact transition between the part not in contact with the ground and the part in contact with the ground, characterized in the measurement signal by a coming-into-contact curvature variation spike 21, 31 that is the opposite of the spike in the variation of contact curvature 30, 30, namely in this instance directed upwards. The variation in curvature also exhibits a transition referred to as the coming-out-of-contact transition between the part in contact with the ground and the part not in contact with the ground, characterized in the measurement signal by a coming-out-of-contact curvature variation spike 22, 32 that is the opposite of the spike in the variation of contact curvature 20, 30, namely in this instance directed upwards. The coming-into-contact curvature variation spike 21, 31 and the coming-out-of-contact curvature variation spike 22, 32 correspond to the sudden variations in the radius of curvature of the tyre 1 on entering and leaving the contact patch.

Because the tyre is turning, that same cycle is repeated, with a measurement signal that is stable when there is no contact with the ground, followed by a coming-into-contact curvature variation spike 21, 31, a spike in the variation of contact curvature 20, 30, a coming-out-of-contact curvature variation spike 22, 32 and finally another stable measurement signal where there is no contact with the ground. This cycle corresponds to one revolution of the wheel, and therefore to 360°, represented by the length KT in FIG. 2. For each cycle, the coming-out-of-contact curvature variation spike 22, 32 offers the major advantage of being a sharp spike and especially of being essentially independent of the conditions of the ground and of the tyre 1. Specifically, the coming-out-of-contact curvature variation spike 22, 32 corresponds to the change in curvature of the tyre 1 on leaving the contact patch, when the region of the tyre 1 in which the sensor 10 is situated passes abruptly from the flat state characteristic of the part in contact with the ground to the curved state characteristic of the part not in contact with the ground. On loose ground, as the tyre 1 progressively rolls, it compacts the ground beneath it, forming a rut, and therefore a rut bottom that is fairly firm and on which the tyre 1 rests as it leaves the contact patch. Furthermore, the forward progress of the vehicle 9 takes the strain essentially towards entering the contact patch. The tyre 1 on leaving the contact patch thus has a coming-out-of-contact behaviour, in terms of curvature, very similar to the way in which a tyre 1 behaves on a road.

It is thus easy to identify each cycle corresponding to a revolution of the wheel by identifying each coming-out-of-contact curvature variation spike 22, 32. It is also possible to identify the cycles using a dedicated device, such as a rev counter. On that basis, the data can be expressed as a function of the degree of angle in each cycle. That notably means that the cycles and their data can be compared independently of the speed of the vehicle 9. The method steps require just one cycle in order to be implemented, and can therefore be implemented on each cycle. However, in order to make the method more robust with respect to potential isolated unpredictable incidents (the presence of a stone for example), it is possible to use a combination of several measured cycles, for example using a moving average.

The loading and the condition of firmness of the ground influence the characteristics of the profile of the measurement signal. The invention therefore seeks to extract parameters from the measurement signal in order therefrom to deduce the loading, with knowledge of the condition of firmness of the ground. The method therefore comprises the determination (step S2), from the measurement signal, of measurement data comprising at least a first parameter KL representative of a length of a contact patch 6 in contact with the ground during a revolution of the wheel bearing the tyre 1. The measurement data may comprise other parameters or values derived from the measurement signal. As a preference, the measurement data also comprise a second parameter KS representative of a rate of flattening of the tyre upon contact with the ground during a revolution of the wheel bearing the tyre 1.

The first parameter KL is determined from a part of the measurement signal corresponding to the part in contact with the ground. More specifically, the first parameter KL is determined from a distance between the coming-into-contact curvature variation spike 31 and the coming-out-of-contact curvature variation spike 32. As these represent two local maxima in the cycle, it is easy to identify the top of each spike and from that deduce the distance between them, expressed in degrees. Since the coming-into-contact curvature variation spike 31 and the coming-out-of-contact curvature variation spike 32 respectively correspond to the start and the end of the part in contact with the ground, the first parameter KL is indeed a function of the area of the tyre 1 in contact with the ground. In fact, KL corresponds to the length of the contact patch 6. In the example, with the measurement signal being expressed in volts V as a function of angular degrees °, the first parameter KL may be expressed in degrees of angle.

The second parameter KS is determined from a part of the measurement signal corresponding to a transition of the curvature of the tyre between the part not in contact with the ground and the part in contact with the ground. More specifically, the second parameter KS is determined from a gradient between the coming-into-contact curvature variation spike 31 and the spike in the variation of contact curvature 30. More specifically, the second parameter KS may correspond to the maximum variation in the variation of curvature between the coming-into-contact curvature variation spike 31 and the spike in the variation of contact curvature 30, namely may correspond to the maximum gradient. In the example, with the measurement signal being expressed in volts V as a function of angular degrees °, the second parameter KS may have the units V/°, namely may correspond to the second derivative of the curvature of the tyre 1.

KS may be approximated in a number of ways. For example, the second parameter KS may correspond to the maximum (in the sense of absolute value) of the derivative of the measurement signal between the coming-into-contact curvature variation spike 31 and the spike in the variation of contact curvature 30, the derivative being estimated from the difference between two successive (or closely-spaced) measurement points, obviously taking their angular separation into consideration. As this is a decreasing gradient in the example, this maximum in the sense of absolute value corresponds to a minimum of the derivative of the measurement signal between the coming-into-contact curvature variation spike 31 and the spike in the variation of contact curvature 30. It is also possible, rather than looking for a derivative extremum, to choose fixed measurement points, such as, for example, those situated equidistant from the tops of the coming-into-contact curvature variation spike 31 and of the spike in the variation of contact curvature 30, and calculate the derivative using these points. It is also possible to use the measurement points corresponding to a measurement signal value, such as, for example, the signal passing through zero in the case illustrated. It is also possible to use more complex approaches, such as, for example, the Savitzky-Golay algorithm. However, choosing a relatively low sampling frequency, typically less than or equal to 500 Hz, and preferably less than or equal to 400 Hz, such as the frequency of 300 Hz in the example, amounts to smoothing the measurement signal and makes it possible to select approaches, such as those set forth above, that are less demanding in terms of computation.

The first parameter KL and the second parameter KS have the advantage of exhibiting a wide degree of variability as a function of the firmness of the ground, and of the loading, and of being easily obtained, as demonstrated hereinabove. More specifically, as the firmness of the ground decreases, the first parameter KL increases whereas the second parameter KS decreases. Thus, the looser the ground, the longer the length (represented by the first parameter KL) of the contact patch 6 in which the tyre is in contact with the ground 7, whereas the rate of flattening (represented by the second parameter KS) becomes smaller. Conversely, as the firmness of the ground 7 increases, the first parameter KL decreases whereas the second parameter KS increases.

For the same firmness of the ground 7 and the same pressure, as the loading increases, the first parameter KL increases, whereas the second parameter KS varies practically not at all. Thus, knowing the firmness of the ground 7 or knowing the second parameter KS allows the effects that variations in loading have on the first parameter KL to be distinguished from the effects of the variations in the firmness of the ground 7. Thus, once the internal pressure inside the tyre 1 and the firmness of the ground 7 are known, it is possible to determine the loading of the tyre 1 from the first parameter KL, irrespective of the speed and the slip, in a way that is reliable for all conditions of firmness of the ground 7, and not solely on road.

Knowledge of the firmness of the ground 7 can be provided directly in the form of a firmness factor, derived separately from measurements (for example taken by the sensor 10 or by other sensors) taken while the tyre is rolling along said ground. It is, for example, possible to implement a method for evaluating the firmness of the ground 7 on which is running a vehicle having at least one fitted tyre having a radial stiffness $k_{radial}$ comprising a tyre casing having a crown 3, two sidewalls 4 and two beads, which tyre casing is equipped with at least one sensor 10 sensitive to the circumferential curvature and positioned in line with the crown, the method comprising the following steps:

estimating a value of the curvature $\rho_A$ of the tyre casing corresponding to first steady-state conditions of the tyre casing in contact with the ground 7;

evaluating the relative firmness of the ground 7 with respect to the radial stiffness $k_{radial}$ of the wheel-tyre assembly as being a function of the value of the curvature $\rho_A$ of the tyre casing.

This method for evaluating the firmness of the ground may also comprise the following steps:

estimating a value of the curvature $\rho_B$ of the tyre casing corresponding to second steady-state conditions of the tyre casing not in contact with the ground;

evaluating the relative firmness of the ground with respect to the radial stiffness kradial of the wheel-tyre assembly as being a function of the value of the curvature $\rho_A$ under the first steady-state conditions and of the value of the curvature $\rho_B$ of the tyre casing under the second steady-state conditions.

More specifically, the method for evaluating the firmness of the ground comprises the following steps:

establishing the relative curvature C as being the ratio $\rho_A/\rho_B$;

evaluating the relative firmness of the ground with respect to the radial stiffness $k_{radial}$ of the wheel-tyre assembly as being a function of the relative curvature C.

In particular, the connection between the relative firmness of the ground with respect to the radial stiffness $k_{radial}$ of the wheel-tyre assembly can be given by the following formula:

$$\frac{k_{ground}}{k_{radial}} = \frac{|1 + \alpha * C - (1 + \alpha) * C^2|}{\beta * C},$$

in which $\beta$ is a polynomial function of the internal inflation pressure P of the wheel-tyre assembly of the following type: $\beta = \beta_1 * (P)^{\beta_2}$. The coefficients $\alpha$, $\beta_1$ and $\beta_2$ are coefficients that are dependent on the tyre fitted.

It is also possible to determine the firmness of the ground from the first parameter KL and from the second parameter KS. Considered individually, the first parameter KL and/or the second parameter KS may also be dependent on the load, the pressure, and/or the speed. However, taking both the first parameter KL and the second parameter KS into consideration means that the firmness of the ground can be determined from these parameters alone, without knowledge of the load, the pressure, the speed and the slip of the tyre 1 on the ground.

As a preference, it is the electronic board 12 of the sensor 10 which, from the measurement signal, determines the measurement data comprising the first parameter KL and the second parameter KS. These measurement data are then transmitted by the sensor 10 to a data processing unit 15 which performs the next part of the method. This data processing unit 15 is preferably situated outside the tyre 1, for example in the vehicle 9, but the processing unit 15 may also be distant from the vehicle 9 and the transmission of the data may then involve intermediate transmission means. The transmission of the measurement data between the sensor 10 and the data processing unit 15 is then performed wirelessly. The data processing unit 15 typically comprises a processor and a memory and is suited to receiving and processing the measurement data when implementing the next part of the method for determining the loading of the tyre and possibly the firmness of the ground.

It is possible to transmit the measurement signal to the processing unit 15 for implementing the next part of the method. However, determining the measurement data using the sensor 10 and transmitting these measurement data alone to the data processing unit 15 offers the advantage of reducing the amount of data transmitted between the sensor 10 and the data processing unit 15. As the transmission of data consumes a great deal of energy, transmitting the measurement data rather than the measurement signal allows a limitation of the electrical power consumption of the sensor 10, which has limited powering options inside the tyre 1.

It is also advantageous not to use the electronic board 12 of the sensor 10 for implementing the next part of the method but rather to use the data processing unit 15 to process the measurement data. This then limits the calculations performed by the electronic board 12 of the sensor 10, making it possible to save power and memory on the electronic board 12. In addition, it is easier to modify the ways in which the next part of the method is implemented on a readily accessible data processing unit 15 rather than on the sensor 10 which is inside the tyre 1.

The measurement of the internal pressure inside the tyre, as determined by the pressure probe 13, may be transmitted directly to the processing unit 15, or else may be transmitted to the electronic board 12 of the sensor 10, which then transmits it to the processing unit 15. As a preference, this transmission is performed in combination with the measurement data.

Once the processing unit 15 has received the measurement data and the measurement of the internal pressure of the tyre, the processing unit 15 can determine the loading of the tyre 1 from the measurement of the internal pressure of the tyre, the first parameter KL and the firmness factor. Beforehand, if the firmness factor is not supplied, it is possible to determine the firmness of the ground as a function of the first parameter KL and of the second parameter KS which are contained in the measurement data and which vary as a function of the firmness of the ground, as demonstrated hereinbelow.

Figure 4:
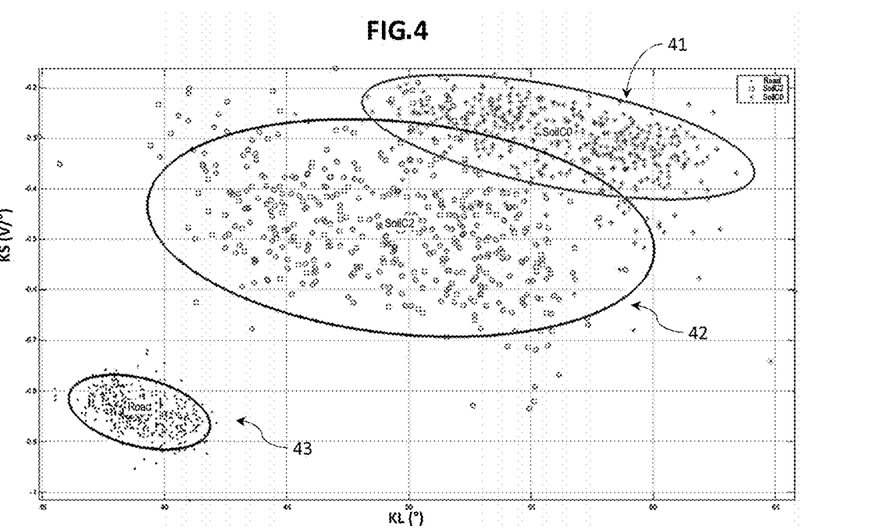
FIG. 4 gives an example of a two-dimensional statistical analysis using the two parameters derived from the measurement signal for a front tyre of a vehicle according to different conditions of firmness of the ground.

FIG. 4 gives an example of a two-dimensional statistical analysis using the two parameters KL and KS derived from the measurement signal for a tyre 1 of a vehicle 9 running on ground 7 of known firmness. In this example, the measurement data are derived from a measurement signal acquired by a piezoelectric sensor 10 situated in a front tyre of an agricultural tractor when running over the same ground with three different firmness configurations:

C0 (very loose ground): newly ploughed soil which has then been harrowed,

C2 (fairly loose ground): newly ploughed and harrowed soil which has been compacted twice by the passage of a tyre 1 (by the front and rear wheels of the vehicle 9, therefore corresponding to the passage of the vehicle 9), road (hard ground): asphalted surface.

It should be noted that the measurement points group together varying loads, pressures and speeds (below 20 km/h).

The measurement points are expressed as a function of the first parameter KL (on the abscissa axis and in degrees of angle) and of the second parameter KS (on the ordinate axis and in V/°). These values are obviously dependent on the type of tyre 1 and on the sensor 10 that are used. The crosses correspond to running on very loose ground C0 and are grouped together in a first, 95% confidence, ellipsoid 41. The circles correspond to running on fairly loose ground C2 and are grouped together in a second, 95% confidence, ellipsoid 42. The dots correspond to measurement points when running on a road (very firm ground) and are grouped together in a third, 95% confidence, ellipsoid 43. The examples of FIG. 4 thus give an indication of the values adopted by the parameters KL and KS. For example, on a road, the second parameter KS is comprised between −0.7V/° and −1 V/°, while the first parameter KL is comprised between 35° and 43°.

It may be noticed that the third confidence ellipsoid 43 is markedly separated from the other two. The two parameters KL and KS therefore allow a very hard ground such as roadway to be easily identified. It may also be noticed that while the first confidence ellipsoid 41 and the second confidence ellipsoid 42 overlap slightly, they are nevertheless sufficiently separate for it to be possible to distinguish a measurement point with ground C0 from a measurement point with ground C2. Thus, taking a combined view of the parameters KL and KS makes it possible to identify the condition of firmness of the ground, in spite of loads, pressures and speeds that may vary.

More specifically, the measurement data comprising the parameters KL and KS are used to analyse the measurement signal in order to determine the firmness category to which the ground on which the tyre 1 is running belongs. The use of categories means that any feedback of information to the driver or exploitation by an automated system can be facilitated and simplified while at the same erasing measurement imprecisions and fluctuations. The use of firmness categories is not compulsory, since it is possible to express the firmness by means of a numerical value, such as, for example, a percentage, although this is the preferred embodiment which is set out hereinbelow.

By way of nonlimiting illustration, the following categories can be used:

TABLE 1

| Category | D0 | D1 | D2 | D3 | D4 | D5 |
|---|---|---|---|---|---|---|
| Firmness Example | Very loose Soil C0 | Loose Soil C1 | Semi-loose Soil C2 or C3 | Semi-hard grass | Hard track | Very hard road |

In this table, soil C0 is newly ploughed soil which has been harrowed, soil C1 is soil C0 which has been compacted by the passage of a wheel (only the front wheel), soil C2 is soil C0 which has been compacted by the passage of two wheels (the front wheel and the rear wheel), soil C3 is soil C0 which has been compacted by the passage of three wheels (the front wheel, the rear wheel, and then the front wheel again). It should be noted that soils C2 and C3 (and possibly the next) are grouped together in the same category because the soil very soon reaches its maximum degree of compaction when run over by a vehicle 9. These categories offer the advantage of taking account of the respective effects, on the firmness of the ground, of being run over by the front wheels and the rear wheels. Of course, other categories could be used. It might for example be possible to use even looser categories, for example indicative of very loose muddy ground, or even ground with a lack of bearing capacity.

The firmness of the ground is therefore determined using a relationship connecting the firmness of the ground, the first parameter KL and the second parameter KS. Thus, having been determined, the first parameter KL and the second parameter KS are then used to determine a firmness factor using this relationship. Thus, if the firmness factor is denoted F and a function corresponding to the relationship and relating to the first parameter KL and the second parameter KS is denoted $f_F$, then the following may be written:

$$F=f_F(KL,KS)$$

As a preference, this relationship is a linear relationship. More specifically, the linear relationship may be in the form:

$$F=a+b \times KL+c \times KS$$

where F is the firmness factor, KL is the first parameter, KS is the second parameter, and a, b and c are predetermined non-zero fixed real coefficients. The relationship may be bilinear, and therefore of the type:

$$F=a+b \times KL+c \times KS+m \times KL \times KS$$

where a, b, c and m are predetermined non-zero fixed real coefficients.

It should be noted that the relationship connecting the firmness of the ground, the first parameter KL and the second parameter KS may obviously take other parameters into consideration and, in particular, may consider the pressure of a tyre, the speed, or else the length KT (wheel revolution).

The fixed coefficients a, b, c and m are preferably chosen to maximize the discrimination between ground firmness categories. It is possible for example to use a one-dimensional discriminant analysis. This discriminant analysis seeks to maximize the separations between the centres of gravity of each of the ground firmness categories, while at the same time minimizing the spread within the category.

Figure 5:
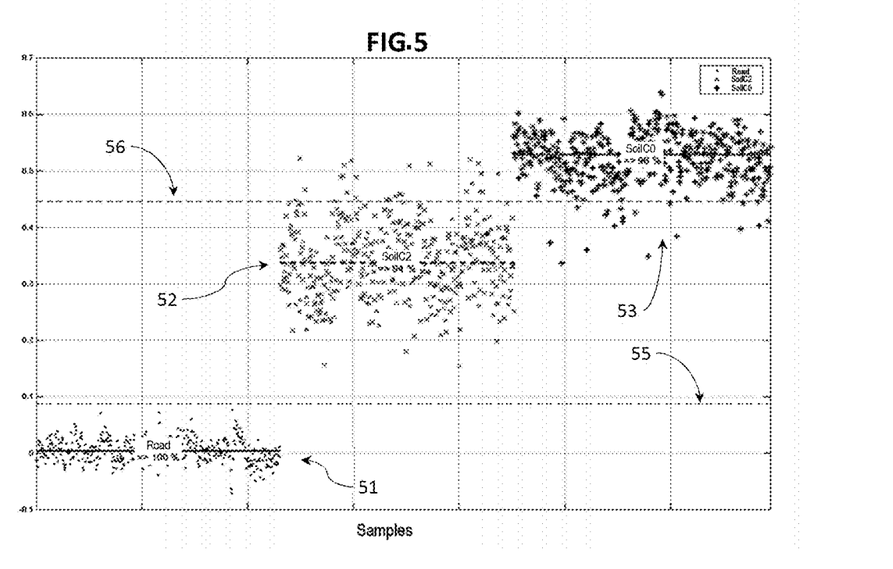
FIG. 5 gives an example of a one-dimensional discriminant analysis for a front tyre of a vehicle.

FIG. 5 gives an example of a one-dimensional discriminant analysis for a front tyre 1 of a vehicle 9 for the same data as those of FIG. 4. The samples (1388 exactly) are grouped together by running configuration along the abscissa axis, while the ordinate axis corresponds to the discriminant axis. The measurement points were recorded with three different firmness configurations. A first set 51 of measurement points groups together the measurement points recorded on the road, a second set 52 of measurement points groups together the measurement points recorded on a very loose soil, corresponding to the soil configuration C0, a third set 53 of measurement points groups together the measurement points recorded on a semi-loose soil, corresponding to the soil configuration C2. Discriminant analysis of the parameters KL and KS consists in combining these two parameters in order from them to deduce a third which corresponds to a firmness factor $F_{AD}$ which corresponds to the ordinate value of each measurement point. The relationship is then as follows:

$$F_{AD}=0.012516 \times KL+0.57576 \times KS$$

With reference to the general formula given earlier, it is therefore found that: a=0, b=0.012516, and c=0.57576. The values of the fixed coefficients obviously depend on the type of tyre, on the sensor 10 used, on its arrangement on the front or rear tyre, and on the ground configurations used to collect the data.

The discriminant analysis makes it possible to determine the classification thresholds that separate the various categories. In the example of FIG. 4, the resultant thresholds are depicted as dotted horizontal lines. Thus, a first line 55 demarcates the "road" category from the "soil C2" category, with a classification threshold at 0.088066. A second line 56 demarcates the "soil C2" category from the "soil C0" category, with a classification threshold at 0.44572.

Thus, having been determined, the first parameter KL and the second parameter KS are used to determine a firmness factor, and the on-the-ground firmness category is determined by comparing this firmness factor against classification thresholds. In this example, the mean probability of correct detection of the three categories (road, soil C2, and soil C0) rises as high as 97%, distributed as follows:

100% for the road classification,
94% for the soil C2 classification,
96% for the soil C0 classification.

Excellent correspondence between the firmness categories determined by the method and the actual firmness of the ground configurations at the measurement points is thus obtained.

It should be noted that the behaviour of a tyre 1 mounted at the front of a vehicle 9 differs from the behaviour of a tyre 1 mounted at the rear of the vehicle 9, essentially because of the different respective dimensions of a front tyre 1 and of a rear tyre 1, but also because of the compaction of the soil by the front tyre 1, which increases the firmness of the ground over which a rear tyre 1 runs. As a result, the relationship connecting the firmness of the ground, the first parameter KL and the second parameter KS for a front tyre 1 and for a rear tyre may differ. As a preference, the sensor 10 is situated inside a front tyre 1, giving better consideration to the effective firmness of the ground as it stands before being compacted by being run over by a tyre 1. Thus, using the linear relationship expressed above, the fixed coefficients a, b and c may differ according to the position of the sensor 10, in a front tyre 1 or in a rear tyre 1. As a further preference, a sensor 10 is placed in a front tyre 1 and another sensor 10 is placed in the rear tyre that follows said front tyre (namely generally on the same side of the vehicle 9). It is then possible to have two linear relationships, one for the front tyre and the other for the rear tyre:

$$\begin{cases} F_{AV} = a_{AV} + b_{AV} \times KL_{AV} + c_{AV} \times KS_{AV} \\ F_{AR} = a_{AR} + b_{AR} \times KL_{AR} + c_{AR} \times KS_{AR} \end{cases}$$

where $F_{AV}$ is the firmness determined from the measurement data of the front tyre, $KL_{AV}$ is the first parameter for the front tyre, $KS_{AV}$ is the second parameter for the front tyre, and $a_{AV}$, $b_{AV}$, $c_{AV}$ are predetermined fixed coefficients for the front tyre, and where $F_{AR}$ is the firmness determined from the measurement data of the rear tyre, $KL_{AR}$ is the first parameter for the rear tyre, $KS_{AR}$ is the second parameter for the rear tyre, and $a_{AR}$, $b_{AR}$, $c_{AR}$ are predetermined fixed coefficients for the rear tyre.

By way of example, it is possible to have the following two relationships:

$$\begin{cases} F_{AV} = 0.012516 \times KL_{AV} + 0.57576 \times KS_{AV} \\ F_{AR} = 0.011622 \times KL_{AR} + 1.2213 \times KS_{AR} \end{cases}$$

Insofar as the firmnesses experienced by the front tyre and the by the rear tyre are derived from different discriminant analyses, $F_{AV}$ and $F_{AR}$ are not directly on the same scales. However, it is preferable to be able to compare and exploit jointly the firmnesses determined from the front tyre and from the rear tyre by finding a common scale for expressing these two firmnesses. The "road" category may be selected as common reference, in so far as is appears to contain little spread, this making it possible to determine the conversions for readjusting the scales. It is a simple matter of modifying the respective fixed coefficients a, b and c of the two relationships.

These firmnesses can also be expressed as a function of the spread of the measurements: the highest firmness of the measurement points may then correspond to one end of a scale, while the lowest firmness of the measurement points may then correspond to the other end of the scale. Percentages may for example be used to express the firmness, with 100% for the highest firmness factor and 0% for the lowest firmness factor. Once again, it is a simple matter of modifying the respective fixed coefficients a, b and c of the two relationships.

Returning to the example of the two relationships given above, these two relationships may express a firmness factor as a percentage, on the one same scale:

$$\begin{cases} F(\%) = 90.03840 - 1.59822 \times KL_{AV} - 73.58853 \times KS_{AV} \\ F(\%) = 62.80775 - 1.48666 \times KL_{AR} - 156.23955 \times KS_{AR} \end{cases}$$

Figure 9:
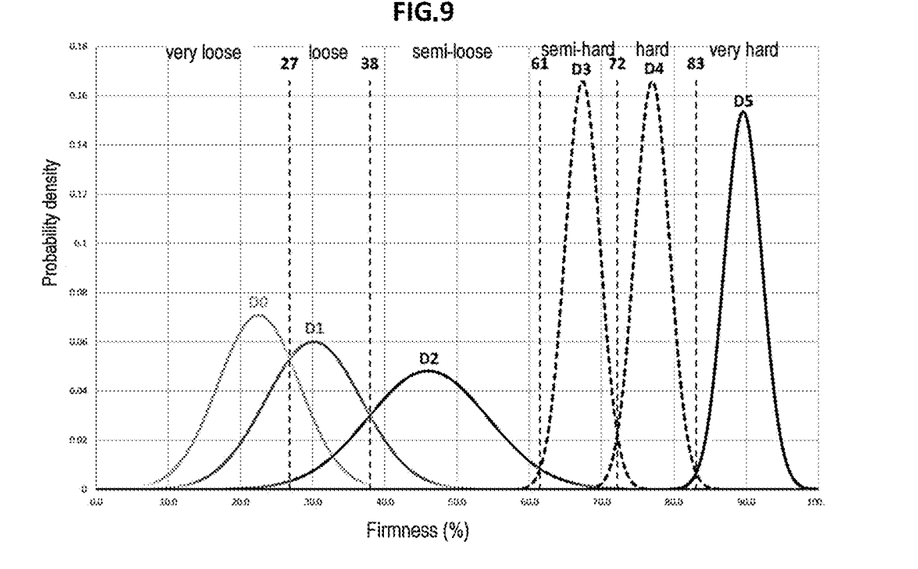
FIG. 9 gives an example of classification of the firmness of the ground.

By way of example, FIG. 9 shows a classification of the firmness of the ground as a percentage for the six categories of Table 1, with the classification thresholds represented by dashed vertical lines, and the indications of probability density for each category modelled using a normal law.

Table 1 can thus be supplemented with the corresponding thresholds, to give the following table:

TABLE 2

| Category | D0 | D1 | D2 | D3 | D4 | D5 |
|---|---|---|---|---|---|---|
| Firmness | Very loose | Loose | Semi-loose | Semi-hard | Hard | Very hard |
| Spread | 0 to 27% | 27 to 38% | 38 to 61% | 61 to 72% | 72 to 83% | 83 to 100% |
| Example | Soil C0 | Soil C1 | Soil C2 or C3 | Grass | Track | Road |

These categories are determined beforehand and stored in the memory of the processing unit 15 which also stores the relationship connecting the firmness of the ground, the first parameter KL and the second parameter KS. The categories can be used by the processing unit 15 to process the measurement data for the tyre 1 and the corresponding sensor 10 in order to determine the firmness category of the ground over which the tyre 1 is running. For example, if the firmness factor (as a percentage) F (%) calculated for a pair consisting of a first parameter KL and of a second parameter KS which are derived from the measurement signal is 92%, that means that the tyre 1 is running over very hard ground, such as a road, belonging to the category D5.

Knowing the firmness offers numerous advantages. For example, in the presence of loose ground, the inflation pressure of a tyre may be lowered in order to widen the area of the contact patch in which the tyre is in contact with the ground, so as to limit the compaction of the ground.

Furthermore, local determination of the firmness of the ground makes it possible to assess the advisability of performing, or not performing, certain operations that are dependent on this condition of firmness. For example, running an implement over soil that is too loose may damage the ground or cause the implement to bog down. The working of the soil may also be affected by the condition of firmness of the ground.

By coupling the firmness conditions with synchronous geolocation data it is possible to establish a map of the firmness of the ground of a plot of land, possibly coupled with other characteristics of the ground. Such a map may prove use for determining how to improve the ground in the plot, for example by installing drainage, adding stone thereto, or loosening compacted soil in a manner modulated according to the needs of the ground.

Suitable steps may then be taken according to the firmness thus determined. For example, in the case of an agricultural tractor with an integral transmission and no central differential, the front axle can be disengaged in order to avoid wearing on hard ground. Conversely, it is also possible for example to reduce the tyre pressure when the ground is very loose, in order to limit the marking of the ground or to reduce the risk of the wheels sinking in.

These steps may be instigated by the data processing unit 15 which has determined the firmness of the ground, particularly in the case that this is a central control unit of the vehicle 9. It is also possible that the data processing unit 15 that has determined the firmness of the ground merely transmits the information consisting of the firmness of the ground (expressed as a magnitude or synthesised into the form of an indication of category) to some other control member and/or to a display device in order to inform the user thereof.

Once the firmness has been obtained (step S22), by the provision of a firmness factor or by this firmness factor being determined as described hereinabove, it is possible to determine a loading factor (step S3) as described hereinbelow.

Figure 6:
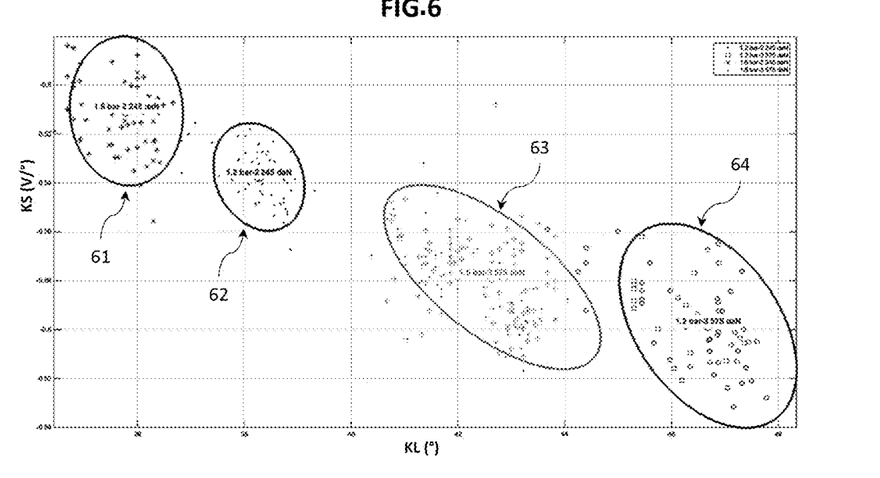
FIG. 6 gives an example of a two-dimensional statistical analysis using the two parameters derived from the vehicle measurement signal for several configurations of internal pressure and loading of a rear tyre on road (very hard ground)

FIG. 6 gives an example of a two-dimensional statistical analysis using the two parameters KL and KS derived from the measurement signal for a tyre 1 of a tyre 1 of a vehicle 9 running on ground 7 consisting of a road, namely ground that is very hard. In this example, the measurement data are derived from a measurement signal acquired by a piezoelectric sensor 10 situated in a rear tyre of an agricultural tractor when running on road with four different pressure and loading configurations: It should be noted that the measurement points group together varying speeds (below or equal to 20 km/h).

The measurement points are expressed as a function of the first parameter KL (on the abscissa axis and in degrees of angle) and of the second parameter KS (on the ordinate axis and in V/°). These values are obviously dependent on the type of tyre 1 and on the sensor 10 that are used. A first, 95% confidence, ellipsoid 61 groups together measurement points corresponding to running at an internal pressure of 1.6 bar and a load of 2245 daN. A second, 95% confidence, ellipsoid 62 groups together measurement points corresponding to running at an internal pressure of 1.2 bar and a load of 2245 daN. A third, 95% confidence, ellipsoid 63 groups together measurement points corresponding to running at an internal pressure of 1.6 bar and a load of 3575 daN. A fourth, 95% confidence, ellipsoid 64 groups together measurement points corresponding to running at an internal pressure of 1.2 bar and a load of 3575 daN.

It will be noticed that the ellipsoids 61, 62, 63, 64 are markedly separated along the axis of the first parameter KL. The first parameter KL decreases with pressure, and increases with load. This first parameter KL alone could, therefore, on road, be sufficient to distinguish between four categories of pressure-loading configurations, and therefore, with knowledge of the pressure, to distinguish between the loading categories. However, it should be noted that the second parameter KS also varies between configurations, even though it allows, although not as well as the first parameter KL, the various configurations to be distinguished. The second parameter KS can thus be used to refine the discrimination obtained with the first parameter KL. This becomes all the more beneficial as the second parameter KS is sensitive to the firmness of the ground 7 and taking it into consideration therefore allows the effects of this firmness to be taken into account.

Figure 7:
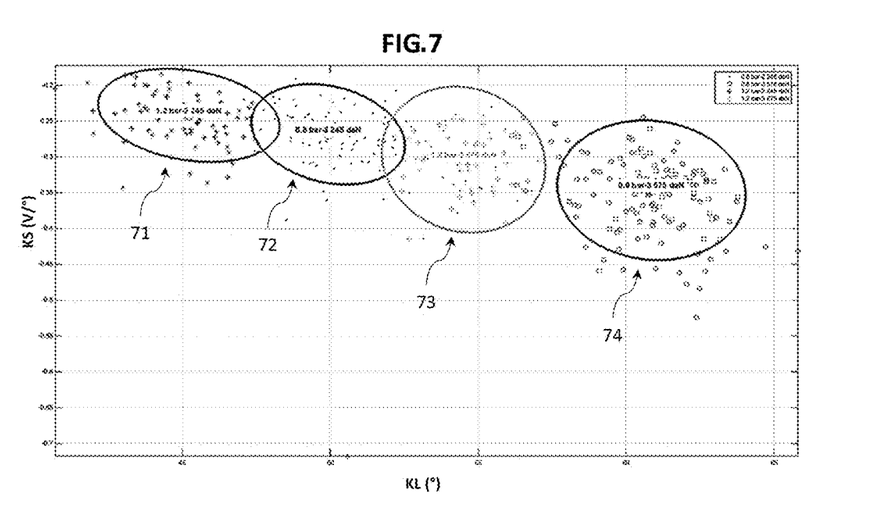
FIG. 7 gives an example of a two-dimensional statistical analysis using the two parameters derived from the vehicle measurement signal for several configurations of internal pressure and loading of a rear tyre on loose ground.

FIG. 7 gives an example of a two-dimensional statistical analysis using the two parameters KL and KS derived from the measurement signal for a tyre 1 of a tyre 1 of a vehicle 9 running on ground 7 consisting of newly ploughed soil which has been harrowed, and compacted by the passage of a wheel (only the front wheel), which ground is referred to above as soil C1. As in the previous example, the measurement data are derived from a measurement signal acquired by a piezoelectric sensor 10 situated in a rear tyre of an agricultural tractor when running in four different pressure and loading configurations. It should be noted that the measurement points group together varying speeds (below 20 km/h). In comparison with the configurations of FIG. 6, the pressures are lower (1.2 bar and 0.8 bar as compared with, respectively, 1.2 bar and 1.6 bar), because running over loose ground is generally done with lower pressures.

The measurement points are expressed as a function of the first parameter KL (on the abscissa axis and in degrees of angle) and of the second parameter KS (on the ordinate axis and in V/°). These values are obviously dependent on the type of tyre 1 and on the sensor 10 that are used. A first, 95% confidence, ellipsoid 71 groups together measurement points corresponding to running at an internal pressure of 1.2 bar and a load of 2245 daN. A second, 95% confidence, ellipsoid 72 groups together measurement points corresponding to running at an internal pressure of 0.8 bar and a load of 2245 daN. A third, 95% confidence, ellipsoid 73 groups together measurement points corresponding to running at an internal pressure of 1.2 bar and a load of 3575 daN. A fourth, 95% confidence, ellipsoid 74 groups together measurement points corresponding to running at an internal pressure of 0.8 bar and a load of 3575 daN.

It will be noticed that the ellipsoids 71, 72, 73, 74 are not as markedly separated along the axis of the first parameter KL, with certain ellipsoids even partially overlapping. In addition, in comparison with FIG. 6, the values of the first parameter KL have varied appreciably. For example, the ellipsoid 62 corresponding to the configuration of a pressure of 1.2 bar and a loading of 2245 daN falls within the range of values comprised between 37° and 39° for the first parameter KL, whereas the ellipsoid 71, which also corresponds to the configuration of a pressure of 1.2 bar and a loading of 2245 daN falls within the range of values comprised between 42° and 47.5° for the first parameter KL. Likewise, the ellipsoid 64 corresponding to the configuration of a pressure of 1.2 bar and a loading of 3575 daN falls within the range of values comprised between 45° and 48° for the first parameter KL, whereas the ellipsoid 73, which also corresponds to the configuration of a pressure of 1.2 bar and a loading of 3575 daN falls within the range of values comprised between 52° and 57° for the first parameter KL.

Therefore it would appear that it is essential to take the firmness of the ground into consideration in order reliably to determine the loading of a tyre from the first parameter KL of the measurement data. More specifically, the measurement data comprising the first parameter KL are used to analyse the measurement signal in order to determine the loading category to which the tyre 1 is being subjected. The use of categories means that any feedback of information to the driver or exploitation by an automated system can be facilitated and simplified while at the same erasing measurement imprecisions and fluctuations. The use of loading categories is not compulsory, since it is possible to express the loading by means of a numerical value, such as, for example, a percentage, although this is the preferred embodiment which is set out hereinbelow.

The loading of the tyre is determined by using a relationship connecting said load, the pressure P, the firmness factor F and the first parameter KL:

$$Z = f_z(P, KL, F)$$

where Z is a loading factor and $f_z$ is a function.

This relationship may be a linear relationship or even a bilinear relationship, of the type:

$$Z = a_c + b_c P + c_c KL + d_c F + e_c P.KL + f_c KL.F + g_c P.KL.F$$

where $a_c$, $b_c$, $c_c$, $d_c$, $e_c$, $f_c$, $g_c$ are predetermined non-zero real coefficients. The coefficients $a_c$, $b_c$, $c_c$, $d_c$, $e_c$, $f_c$, $g_c$ may be fixed for all conditions, or may potentially be dependent on the firmness factor F. In particular, at least a first set of parameters $a_c$, $b_c$, $c_c$, $d_c$, $e_c$, $f_c$, $g_c$ may be used for ground having a firmness factor lower than a threshold value, and at least a second set of parameters $a_c$, $b_c$, $c_c$, $d_c$, $e_c$, $f_c$, $g_c$ may be used for ground having a firmness factor higher than a threshold value. The threshold value for the firmness factor may for example be comprised between 50 and 85, typically 80, delineating loose ground from firm ground (see Table 3 below).

As a preference, the relationship connects the load, a logarithm of the first parameter KL, a logarithm of the firmness factor and a logarithm of the pressure. When the firmness factor is known, this relationship is preferably in the form:

$$Z = d + e \log_{10}(P) + f \log_{10}(KL) + g \log_{10}(F)$$

where Z is a loading factor, P is the internal pressure of the tyre 1, KL is the first parameter, F is the firmness factor and d, e, f and g are predetermined non-zero fixed real coefficients.

When the firmness factor indicating the firmness of the ground is not known, the loading of the tyre is determined using a relationship connecting the load, a logarithm of the first parameter KL, a logarithm of the second parameter KS and a logarithm of the pressure. The relationship is then of the form:

$$Z = d + e \log_{10}(P) + f \log_{10}(KL) + g \log_{10}(f_F(KL, KS))$$

For example, if the function $f_F$ is linear, then:

$$Z = d + e \log_{10}(P) + f \log_{10}(KL) + g \log_{10}(a + b \times KL + c \times KS)$$

where Z is a loading factor, KL is the first parameter, KS is the second parameter, and d, e, f and g are predetermined non-zero fixed real coefficients. When the function $f_F$ is bilinear, it may be the case that:

$$Z = d + e \log_{10}(P) + f \log_{10}(KL) + g \log_{10}(a + b \times KL + c \times KS + m \times KL \times KS)$$

where a, b, c and m are predetermined non-zero fixed real coefficients.

The fixed coefficients $a_c$, $b_c$, $c_c$, $d_c$, $e_c$, $f_c$, $g_c$, d, e, f, g are preferably chosen in order to maximize the discrimination between loading categories. For example, it is possible to use a multilinear regression on measurements grouped together by configuration in order to determine the coefficients of the relationship determining the loading factor. The approach may typically be a statistical approach based on several hundred measurement points for several configurations. In particular, the median value of the first parameter KL can be determined for each configuration, with the multilinear regression then performed subsequently.

By way of example, from over 800 measurement points, the data obtained can be summarized in the form of a table:

TABLE 3

| Ground (firmness category) | P (bar) | KL (°) | F (%) | Z (daN) |
|---|---|---|---|---|
| Road (D5) | 1.2 | 38.27 | 89.6 | 2245 |
| Road (D5) | 1.2 | 46.49 | 89.6 | 3575 |
| Road (D5) | 1.6 | 35.79 | 89.6 | 2245 |
| Road (D5) | 1.6 | 42.63 | 89.6 | 3575 |
| Soil C3 (D2) | 1.2 | 42.46 | 46 | 2245 |
| Soil C3 (D2) | 1.2 | 49.67 | 46 | 3575 |
| Soil C3 (D2) | 0.8 | 47.38 | 46 | 2245 |
| Soil C3 (D2) | 0.8 | 58.84 | 46 | 3575 |
| Soil C1 (D1) | 1.2 | 45.15 | 30.1 | 2245 |
| Soil C1 (D1) | 1.2 | 53.22 | 30.1 | 3575 |
| Soil C1 (D1) | 0.8 | 49.49 | 30.1 | 2245 |
| Soil C1 (D1) | 0.8 | 60.15 | 30.1 | 3575 |

With reference to the general formula given above involving the logarithms, multi-regression (with a regression coefficient of 0.98) yields:

$$Z = -28157.34 + 4916.13 \log_{10}(P) + 16352.99 \log_{10}(KL) + 2079.63 \log_{10}(F)$$

namely d=−28157.34, e=4916.13, f=16352.99, g=2079.63. The values of the fixed non-zero coefficients obviously depend on the type of tyre, on the sensor 10 used, on its arrangement on the tyre 1, and on the ground configurations used to collect the data. These values are given for a rear tyre 1. Using the same protocol yields the following for a front tyre: d=−16135.85, e=2284.29, f=8953.35, g=1718.28. It should be noted that in the event that the firmness factor is not provided, the same coefficients a, b, and c as above may be applied.

By a statistical analysis of this estimated loading across the various types of ground, all pressures combined, the loading classification thresholds can be deduced therefrom (in this instance for a rear tyre). The classification thresholds are of course dependent on the loading categories that are to be identified, which are dependent on the vehicle 9, on the tyre 1 and on the use that is to be made of the loading information.

Figure 8:
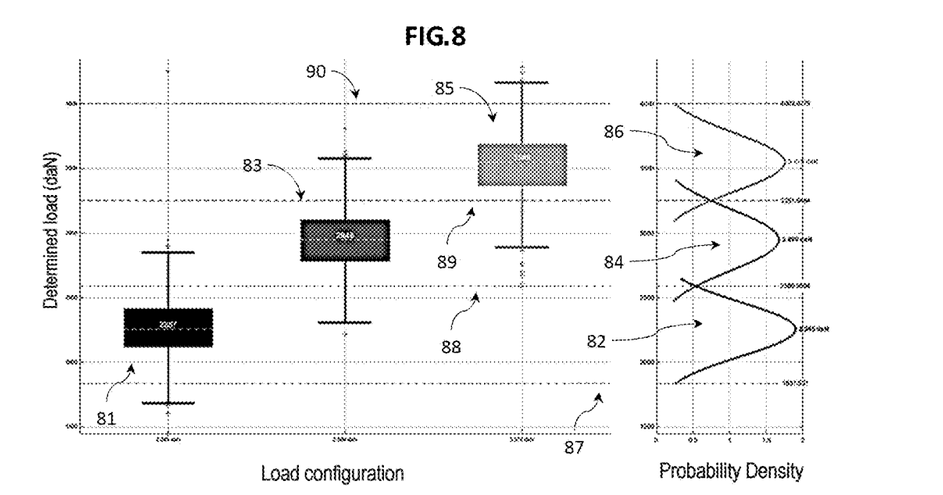
FIG. 8 gives an example of classification of the load.

By way of example, FIG. 8 shows the thresholds determined for three different loading configurations (2245 daN, 2890 daN, and 3575 daN). A first diagram in box 81 shows the determined load, in daN, for a first loading configuration of 2245 daN, associated with a first probability density 82. A second diagram in box 83 shows the determined load, in daN, for a second loading configuration of 2890 daN, associated with a second probability density 84. A third diagram in box 85 shows the determined load, in daN, for a third loading configuration of 3575 daN, associated with a third probability density 86.

The median values for the determined loads for each of the configurations are very close to the respective loadings for each configuration. The median load determined for the first loading configuration of 2245 daN is thus 2257 daN, the median load determined for the second loading configuration of 2890 daN is thus 2949 daN, and the median load determined for the third loading configuration of 3575 daN is thus 3549 daN.

The classification thresholds may then correspond to the intersections of the probability densities 82, 84, 86. The dotted lines 87, 88, 89 and 90 illustrate the classification thresholds which are therefore approximately 1837, 2590, 3252, and 4004. A distinction can therefore be made between the following classifications:

TABLE 4

| Loading classification | Lower limit (daN) | Upper limit (daN) |
|---|---|---|
| Very light load | — | 1837 |
| Light load | 1837 | 2590 |
| Moderate load | 2590 | 3252 |
| Heavy load | 3252 | 4004 |
| Very heavy load | 4004 | — |

These categories are determined beforehand and stored in the memory of the processing unit 15 which also stores the relationship connecting the load, a logarithm of the pressure, a logarithm of the first parameter KL and the firmness factor or a logarithm of the second parameter KS. The categories can be used by the processing unit 15 to process the measurement data for the tyre 1 and the corresponding sensor 10 in order to determine the category of loading of the tyre 1 while it is running.

Knowing the loading offers numerous advantages. It is thus possible to monitor the levels of tyre loading in order to ensure that the tyre is used within satisfactory conditions of safety, particularly with regard to other factors such as the speed of the vehicle, or the load-bearing capacity of the tyre. In addition, tyre loading may be monitored in order to determine other characteristics relating to tyre wear, for example by using a loading history in order the better to estimate tyre wear and decide to replace the tyre at the most opportune moment. In addition, actions can be taken in order to adapt the running conditions to the load. For example, the pressure of a tyre can be modified to adapt it to the load being applied to the tyre.

By coupling the loading conditions with synchronous geolocation data it is possible to establish a map of the loading of a plot of land, possibly coupled with other characteristics of the ground. Thus, if the vehicle 9 is a tractor coupled to an implement for working the ground, the load applied to the tyre 1 varies according to the nature of the ground being worked. Such a map may prove use for determining how to improve the ground in the plot, for example by installing drainage or adding soil improvers.

The invention is not restricted to the embodiment described and depicted in the attached figures. Modifications remain possible, particularly regarding the construction of the various elements or by substituting technical equivalents, without thereby departing from the field of protection of the invention.

The invention claimed is:

1. A method for determining a load of a tire mounted on a wheel of a vehicle and running along a ground, the tire being equipped with a sensor configured to acquire a measurement signal representative of a change in curvature of the tire as the tire runs along the ground, the method comprising the following steps:
- acquiring, by the sensor, a measurement signal representative of the change in curvature of the tire during running;
- obtaining a measurement of an internal pressure of the tire;
- determining, from the measurement signal, measurement data comprising a first parameter representative of a length of a contact patch in contact with the ground during a revolution of the wheel bearing the tire;
- obtaining a firmness factor representative of a condition of firmness of the ground, which is derived from measurements taken while the tire is rolling over the ground; and
- determining the load of the tire as a function of the first parameter, of the firmness factor, and of the internal pressure of the tire.

2. The method according to claim 1, wherein the load of the tire is determined by using a relationship connecting the load, the internal pressure, the firmness factor and the first parameter.

3. The method according to claim 1, wherein a relationship connects the load, a logarithm of the first parameter, a logarithm of the firmness factor and a logarithm of the internal pressure, and is of the form:

$$Z = d + e\,\log_{10}(P) + f\,\log_{10}(KL) + g\,\log_{10}(F),$$

where Z is a load factor, P is the internal pressure of the tire, KL is the first parameter, F is the firmness factor, and d, e, f and g are predetermined non-zero fixed real coefficients.

4. The method according to claim 1, wherein, during running, over the course of one revolution of the wheel, the curvature of the tire changes according to a cycle exhibiting:
- a part not in contact with the ground, characterized in the measurement signal by a stable curvature;
- a part in contact with the ground, characterized in the measurement signal by a spike of variation of contact curvature;
- a transition referred to as a coming-into-contact transition between the part not in contact with the ground and the part in contact with the ground, characterized in the measurement signal by a coming-into-contact curvature variation spike that is an opposite of the spike of variation contact curvature;
- a transition referred to as a coming-out-of-contact transition between the part in contact with the ground and the part not in contact with the ground, characterized in the measurement signal by a coming-out-of-contact curvature variation spike that is the opposite of the spike of variation spike of contact curvature; and
- the first parameter being determined from a distance between the coming-into-contact curvature variation spike and the coming-out-of-contact curvature variation spike.

5. The method according to claim 1, wherein the measurement data comprise a second parameter determined from the measurement signal, representative of a rate of flattening of the tire upon contact with the ground during a revolution of the wheel bearing the tire, and
wherein the firmness factor is determined from the first parameter and from the second parameter.

6. The method according to claim 5, wherein, during running, over the course of one revolution of the wheel, the curvature of the tire changes according to a cycle exhibiting:
- a part not in contact with the ground; and
- a part in contact with the ground,
wherein the first parameter is determined from part of the measurement signal corresponding to the part in contact with the ground, and the second parameter is determined from part of the measurement signal corresponding to a transition in the curvature of the tire between the part not in contact with the ground and the part in contact with the ground.

7. The method according to claim 5, wherein, during rolling, over the course of one revolution of the wheel, the curvature of the tire changes according to a cycle exhibiting:
- a part not in contact with the ground, characterized in the measurement signal by a stable curvature;
- a part in contact with the ground, characterized in the measurement signal by a spike of variation of contact curvature;
- a transition referred to as the coming-into-contact transition between the part not in contact with the ground and the part in contact with the ground, characterized in the measurement signal by a coming-into-contact curvature variation spike that is the opposite of the spike of variation of contact curvature;
- a transition referred to as the coming-out-of-contact transition between the part in contact with the ground and the part not in contact with the ground, characterized in the measurement signal by a coming-out-of-contact curvature variation spike that is the opposite of the spike of variation of contact curvature;
- the first parameter being determined from a distance between the coming-into-contact curvature variation spike and the coming-out-of-contact curvature variation spike; and
- the second parameter being determined from a gradient between the coming-into-contact curvature variation spike and the variation spike of contact curvature.

8. The method according to claim 5, wherein the firmness factor indicating the firmness of the ground is determined using a relationship connecting the firmness factor indicating the firmness of the ground, the first parameter and the second parameter.

9. The method according to claim 8, wherein the relationship connecting the firmness factor indicating the firmness of the ground, the first parameter and the second parameter is a linear relationship of the form:

$$F = a + b \times KL + c \times KS,$$

where F is the firmness factor, KL is the first parameter, KS is the second parameter, and a, b and c are predetermined fixed coefficients.

10. The method according to claim 5, wherein the load of the tire is determined using a relationship connecting the load, a logarithm of the first parameter, a logarithm of the second parameter, and a logarithm of the internal pressure.

11. The method according to claim 10, wherein the relationship is of the form:

$$Z = d + e\,\log_{10}(P) + f\,\log_{10}(KL) + g\,\log_{10}(a + b \times KL + c \times KS),$$

where Z is a load factor, KL is the first parameter, KS is the second parameter, and d, e, f and g are predetermined non-zero fixed real coefficients.

12. The method according to claim 5, wherein the load is determined by calculating a load factor from the first parameter, from the second parameter, and from the internal pressure, and by comparing said load factor against thresholds delimiting load categories.

13. A vehicle comprising:
at least one tire mounted on a wheel of the vehicle;
at least one sensor sensitive to a change in curvature of the tire and configured to generate a measurement signal representative of the change in curvature of the tire as the tire runs over a ground;
at least one pressure probe designed to provide a measurement of the internal pressure of the tire; and
a data processing unit configured to receive the measurement of the internal pressure of the tire and measurement data derived from the measurement signal representative of the change in curvature of the tire as the tire runs over the ground and to determine the firmness of the ground as a function of the measurement data, the measurement data comprising:
   (a) a first parameter representative of a length of a contact patch in contact with the ground during a revolution of the wheel bearing the tire, and
   (b) a second parameter representative of a rate of flattening of the tire upon contact with the ground during a revolution of the wheel bearing the tire,
the vehicle being configured to implement the method according to claim 1.

14. A tire comprising a pressure sensor for an internal pressure inside the tire, and a sensor sensitive to a change in curvature of the tire and configured to generate a measurement signal representative of the change in curvature of the tire as the tire rolls over a ground, comprising an active part and an electronic board, the active part being configured to generate the measurement signal, the electronic board being configured to determine measurement data comprising:
   (a) a first parameter representative of a length of a contact patch in contact with the ground during a revolution of the wheel bearing the tire; and
   (b) a second parameter representative of a rate of flattening of the tire upon contact with the ground during a revolution of the wheel bearing the tire,
the sensor being configured to transmit the measurement data to outside the tire.

15. A data processing unit configured to receive a pressure measurement and measurement data derived from a measurement signal representative of a change in curvature of the tire as the tire runs over a ground, said measurement data comprising:
   (a) a first parameter representative of a length of a contact patch in contact with the ground during a revolution of the wheel bearing the tire, and (b) a second parameter representative of a rate of flattening of the tire upon contact with the ground during a revolution of the wheel bearing the tire,
the data processing unit being configured to determine the load of the tire as a function of the first parameter, of the second parameter, and of the internal pressure.

* * * * *